(12) United States Patent
Singh et al.

(10) Patent No.: US 12,349,050 B2
(45) Date of Patent: Jul. 1, 2025

(54) METHODS, SYSTEMS, AND COMPUTER READABLE MEDIA FOR PRIORITIZING AMONG ALTERNATE NETWORK FUNCTION (NF) INSTANCES

(71) Applicant: Oracle International Corporation, Redwood Shores, CA (US)

(72) Inventors: Virendra Singh, Bangalore (IN); Ankit Srivastava, Uttar Pradesh (IN); Jay Rajput, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 764 days.

(21) Appl. No.: 17/578,300

(22) Filed: Jan. 18, 2022

(65) Prior Publication Data
US 2023/0232322 A1 Jul. 20, 2023

(51) Int. Cl.
*H04W 48/18* (2009.01)
*H04W 8/26* (2009.01)
(Continued)

(52) U.S. Cl.
CPC ............. *H04W 48/18* (2013.01); *H04W 8/26* (2013.01); *H04W 48/16* (2013.01); *H04W 60/00* (2013.01); *H04W 76/18* (2018.02)

(58) Field of Classification Search
CPC ..... H04W 48/16; H04W 48/18; H04W 60/00; H04W 76/18; H04W 8/26
See application file for complete search history.

(56) References Cited

U.S. PATENT DOCUMENTS 11,012,058 B2   5/2021  Dubey et al.
11,265,694 B2 * 3/2022  Farooq ................. H04W 8/005
(Continued)

FOREIGN PATENT DOCUMENTS

WO   WO 2020/202043 A1   10/2020
WO   WO 2022/251324 A1   12/2022

OTHER PUBLICATIONS

US 11,483,406 B1, 10/2022, Srivastava et al. (withdrawn)
(Continued)

*Primary Examiner* — Dung B Huynh
(74) *Attorney, Agent, or Firm* — Jenkins, Taylor & Hunt, P.A.

(57) ABSTRACT

A method for prioritizing among alternate network function (NF) instances includes registering a first NF profile of a first NF instance with a first NF repository function (NRF), and defining, as part of the first NF profile, alternate NF instance information identifying a plurality of individual alternate NF instances to function as backups in response to unavailability of the first NF instance and specifying, for each alternate NF instance, a priority attribute value indicating a relative priority of the alternate NF instance with respect to the other alternate NF instances. The method further includes, at a first consumer NF or SCP, discovering, from the first NRF, the first NF profile of the first NF instance, detecting unavailability of the first NF instance, and, using the alternate NF instance information in the first NF profile to select and contact one of the alternate NF instances identified by the alternate NF instance information.

19 Claims, 6 Drawing Sheets

(51) Int. Cl.
*H04W 48/16* (2009.01)
*H04W 60/00* (2009.01)
*H04W 76/18* (2018.01)

(56) References Cited

U.S. PATENT DOCUMENTS

| | | | |
|---|---|---|---|
| 11,283,883 B1* | 3/2022 | Krishan | H04M 15/44 |
| 11,563,638 B1* | 1/2023 | Jayaramachar | H04L 43/0876 |
| 11,611,626 B1 | 3/2023 | Srivastava et al. | |
| 11,825,370 B2* | 11/2023 | Jayaramachar | H04W 36/16 |
| 11,888,957 B2* | 1/2024 | Krishan | H04L 67/61 |
| 2016/0164680 A1 | 6/2016 | Liao et al. | |
| 2017/0303259 A1* | 10/2017 | Lee | H04W 28/16 |
| 2019/0124572 A1 | 4/2019 | Park et al. | |
| 2019/0223250 A1 | 7/2019 | Dao et al. | |
| 2019/0239150 A1* | 8/2019 | Ma | H04W 48/17 |
| 2019/0273650 A1* | 9/2019 | Ma | H04L 41/5058 |
| 2020/0007632 A1* | 1/2020 | Landais | H04L 67/02 |
| 2020/0136715 A1 | 4/2020 | Venugopal et al. | |
| 2020/0314615 A1 | 10/2020 | Patil et al. | |
| 2020/0389935 A1* | 12/2020 | Jeong | H04W 8/08 |
| 2020/0396132 A1 | 12/2020 | Wang et al. | |
| 2021/0058833 A1 | 2/2021 | Basu Mallick et al. | |
| 2021/0099856 A1* | 4/2021 | Cakulev | H04W 24/02 |
| 2021/0105196 A1 | 4/2021 | Dao et al. | |
| 2021/0111985 A1 | 4/2021 | Mahalank et al. | |
| 2021/0211970 A1 | 7/2021 | Lee et al. | |
| 2021/0219222 A1* | 7/2021 | Jia | H04W 48/18 |
| 2021/0297935 A1* | 9/2021 | Belling | H04W 88/182 |
| 2022/0038545 A1* | 2/2022 | Krishan | H04L 45/74 |
| 2022/0052907 A1* | 2/2022 | Hua | H04L 41/0668 |
| 2022/0053372 A1* | 2/2022 | Shekhar | H04L 67/56 |
| 2022/0060547 A1* | 2/2022 | Krishan | H04L 67/56 |
| 2022/0070648 A1* | 3/2022 | Krishan | H04W 8/005 |
| 2022/0110082 A1* | 4/2022 | Belling | H04W 8/005 |
| 2022/0141662 A1 | 5/2022 | Liao | |
| 2022/0247827 A1* | 8/2022 | Das | H04L 67/51 |
| 2022/0295384 A1* | 9/2022 | Gupta | H04W 8/12 |
| 2022/0303793 A1* | 9/2022 | Patil | H04W 24/04 |
| 2022/0393971 A1* | 12/2022 | Bartolome Rodrigo | H04L 45/304 |
| 2022/0394453 A1* | 12/2022 | Goel | H04L 67/52 |
| 2022/0417783 A1* | 12/2022 | Srivastava | H04W 28/0231 |
| 2023/0007536 A1* | 1/2023 | Sharma | H04W 28/088 |
| 2023/0019209 A1* | 1/2023 | Rajput | H04L 67/51 |
| 2023/0032054 A1* | 2/2023 | Jayaramachar | H04W 8/00 |
| 2023/0052267 A1* | 2/2023 | Goel | H04L 67/51 |
| 2023/0053114 A1* | 2/2023 | Chang | G06F 9/4881 |
| 2023/0070455 A1* | 3/2023 | Wang | H04L 41/5058 |
| 2023/0096969 A1* | 3/2023 | Sapra | H04W 24/02 370/254 |
| 2023/0102122 A1* | 3/2023 | Krishan | H04W 40/02 370/328 |
| 2023/0147549 A1* | 5/2023 | Singh | H04L 41/5041 709/223 |
| 2023/0179481 A1* | 6/2023 | Krishan | H04L 67/51 709/223 |
| 2023/0179653 A1* | 6/2023 | Rodrigo | H04L 67/63 709/226 |
| 2023/0179669 A1* | 6/2023 | Yang | H04W 8/005 709/201 |
| 2023/0180056 A1* | 6/2023 | Krishan | H04W 28/088 370/230 |
| 2023/0188625 A1* | 6/2023 | Rodrigo | H04L 67/63 709/238 |
| 2023/0199632 A1* | 6/2023 | Talebi Ford | H04W 48/16 455/434 |
| 2023/0217355 A1* | 7/2023 | Srivastava | H04L 41/0654 370/329 |
| 2023/0224756 A1* | 7/2023 | Shekhar | H04W 28/08 370/252 |
| 2023/0291818 A1* | 9/2023 | Yang | H04L 67/563 |
| 2023/0385161 A1* | 11/2023 | Lu | G06F 11/1451 |
| 2023/0413214 A1* | 12/2023 | Khare | H04L 43/10 |
| 2024/0015232 A1* | 1/2024 | Rodrigo | H04L 67/51 |
| 2024/0022952 A1* | 1/2024 | Talebi Fard | H04W 72/543 |
| 2024/0022996 A1* | 1/2024 | Lu | H04W 40/248 |
| 2024/0056495 A1* | 2/2024 | Abougamia | H04W 28/084 |
| 2024/0064197 A1* | 2/2024 | Rodrigo | H04L 67/51 |
| 2024/0064212 A1* | 2/2024 | Rodrigo | H04L 67/1012 |
| 2024/0107299 A1* | 3/2024 | Wang | H04L 67/562 |
| 2024/0298196 A1* | 9/2024 | Yang | H04W 76/19 |
| 2024/0323824 A1* | 9/2024 | He | H04W 48/16 |
| 2024/0334323 A1* | 10/2024 | Ozturk | H04W 52/0206 |
| 2024/0373310 A1* | 11/2024 | Fujishiro | H04W 76/10 |

OTHER PUBLICATIONS

Non-Final Office Action for U.S. Appl. No. 17/488,793, filed Mar. 1, 2024.

Interview Summary for U.S. Appl. No. 17/488,793, filed Jun. 4, 2024.

"3rd Generation Partnership Project; Technical Specification Group Core Network and Terminals; 5G System; Network Function Repository Services; Stage 3 (Release 17)," 3GPP TS 29.510, V17.3.0, pp. 1-271 (Sep. 2021).

"3rd Generation Partnership Project; Technical Specification Group Services and System Aspects; System architecture for the 5G System (5GS); Stage 2 (Release 17)," 3GPP TS 23.501, V17.2.0 pp. 1-542 (Sep. 2021).

"3rd Generation Partnership Project; Technical Specification Group Services and System Aspects; Procedures for the 5G System (5GS); Stage 2 (Release 17)," 3GPP TS 23.502, V17.2.1, pp. 1-712 (Sep. 2021).

"3rd Generation Partnership Project; Technical Specification Group Core Network and Terminals; 5G System; Technical Realization of Service Based Architecture; Stage 3 (Release 17)," 3GPP 29.500, V17.4.0, pp. 1-109 (Sep. 2021).

"3rd Generation Partnership Project; Technical Specification Group Core Network and Terminals; 5G System; Principles and Guidelines for Services Definition; Stage 3 (Release 17)," 3GPP TS 29.501, V17.3.1 pp. 1-78 (Sep. 2021).

"3rd Generation Partnership Project; Technical Specification Group Core Network and Terminals; Numbering, addressing and identification; (Release 17)," 3GPP TS 23.003, V17.3.0, pp. 1-145 (Sep. 2021).

"5G; 5G System: Network Function Repository Services; Stage 3 (3GPP TS 29.510 V16.6.0 Release 16)" ETSI TS 129 510 V16.6.0, pp. 1-227 (Jan. 2021).

Non-Final Office Action for U.S. Appl. No. 17/386,649, filed May 23, 2023.

Notice of Allowance and Fee(s) Due for U.S. Appl. No. 17/334,268, filed Nov. 9, 2022.

Notification of Transmittal of the International Search Report and the Written Opinion of the International Searching Authority, or the Declaration for International Application No. PCT/US2022/030874 (Sep. 1, 2022).

"3rd Generation Partnership Project; Technical Specification Group Services and System Aspects; Study on enablers for network automation for the 5G System (5GS); Phase 2 (Release 17)," 3GPP TR 23.700-91, V17.0.0, pp. 1-382 (Dec. 2020).

Notice of Allowance for U.S. Appl. No. 17/334,268, filed Jun. 6, 2022.

Applicant-Initiated Interview Summary for U.S. Appl. No. 17/334,268, filed May 5, 2022.

"5G; System architecture for the 5G System (5GS) (3GPP TS 23.501 version 16.6.0 Release 16)," ETSI TS 123 501, V16.6.0, pp. 1-449 (Oct. 2020).

"5G; 5G System; Network function repository services; Stage 3 (3GPP TS 29.510 version 16.4.0 Release 16)," ETSI TS 129 510, V16.4.0, pp. 1-208 (Jul. 2020).

VMWare, "Configure Security VNF with HA", pp. 1-4 (Sep. 21, 2020).

Non-Final Office Action for U.S. Appl. No. 17/334,268, filed Mar. 28, 2022.

Commonly-Assigned, co-pending U.S. Appl. No. 17/488,793 for "Methods, Systems, and Computer Readable Media for Identifying

(56) References Cited

OTHER PUBLICATIONS

Alternate Delivery Endpoints for Mobile Originated Data and Monitoring Reports in a Communications Network" (Sep. 29, 2021).

"3rd Generation Partnership Project; Technical Specification Group Core Network and Terminals; 5G System; Network Exposure (NE) function services for Non-IP Data Delivery (NIDD); Stage 3 (Release 17)," 3GPP TS 29.541. V17.1.0. pp. 1-40 (Sep. 2021).

Commonly-Assigned, co-pending U.S. Appl. No. 17/386,649 for "Methods, Systems, and Computer Readable Media for Providing for Network Function (NF) Fallback to Recovered NF Repository Function (NRF)" (Unpublished, filed Jul. 28, 2021).

Commonly-Assigned, co-pending U.S. Appl. No. 17/334,268 for "Methods, Systems, and Computer Readable Media for Distributing Network Function (NF) High Availability (HA) Topology Information in a Core Network" (Unpublished, filed May 28, 2021).

"3rd Generation Partnership Project; Technical Specification Group Core Network and Terminals; 5G System; Network Function Repository Services; Stage 3 (Release 17)," 3GPP TS 29.510, V17.1.0, pp. 1-243 (Mar. 2021).

"3rd Generation Partnership Project; Technical Specification Group Services and System Aspects; System architecture for the 5G System (5GS); Stage 2 (Release 17)" 3GPP TS 23.501 V17.0.0 (Mar. 2021).

"3rd Generation Partnership Project; Technical Specification Group Core Network and Terminals; 5G System; Technical Realization of Service Based Architecture; Stage 3 (Release 17)," 3GPP TS. 29.500, V17.2.0, pp. 1-100 (Mar. 2021).

"3rd Generation Partnership Project; Technical Specification Group Services and System Aspects; Procedures for the 5G System (5GS); Stage 2 (Release 17)," 3GPP TS 23.502, V17.0.0, pp. 1-646 (Mar. 2021).

Notice of Allowance and Fee(s) Due for U.S. Appl. No. 17/386,649, filed Jul. 18, 2023.

Notice of Allowance for U.S. Appl. No. 17/488,793, filed Aug. 28, 2024.

* cited by examiner

METHODS, SYSTEMS, AND COMPUTER READABLE MEDIA FOR PRIORITIZING AMONG ALTERNATE NETWORK FUNCTION (NF) INSTANCES

TECHNICAL FIELD

The subject matter described herein relates to implementing priorities among NF instances that function as backups for a primary NF instances in an NF set. More particularly, the subject matter described herein relates to methods, systems, and computer readable media for prioritizing among alternate NF instances when a primary NF instance fails or otherwise becomes unavailable.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains NF profiles of available NF instances, including SCP instances, identifying the services supported by each NF instance. The NF profile of a producer NF instance is referred to in 3GPP TS 29.510. The NF profile of an SCP instance is referred to in 3GPP TS 29.510 as an SCP profile. Consumer NFs can obtain information about producer NF instances that have registered with the NRF through the NF service discovery procedure. According to the NF service discovery procedure, a consumer NF sends an NF discovery request to the NRF. The NF discovery request includes query parameters that the NRF uses to locate NF profiles of producer NFs or SCPs capable of providing the service identified by the query parameters. NF profiles are data structures that define the type of service provided by an NF instance and well as contact and capacity information regarding the NF instance.

An SCP can also invoke the NF service discovery procedure to learn about available producer NF instances. The case where the SCP uses the NF service discovery procedure to obtain information about producer NF instances on behalf of consumer NFs is referred to as delegated discovery. Consumer NFs connect to the service communication proxy, and the service communication proxy load balances traffic among producer NF service instances that provide the required services or directly routes the traffic to the destination producer NF instances. The communications model where consumer NFs communicate with producer NFs via the SCP is referred to as the indirect communications model.

In addition to the SCP, another example of an intermediate proxy that forwards traffic between producer and consumer NFs is the security edge protection proxy (SEPP). The SEPP is the network function used to protect control plane traffic that is exchanged between different 5G public land mobile networks (PLMNs). As such, the SEPP performs message filtering, policing and topology hiding for all application programming interface (API) messages that are transmitted between PLMNs.

One problem that can occur in 5G and other communications networks is that 3GPP standards do not define a mechanism for an SCP or other NF instance to specify prioritization among alternate profile of a first NF instance with a first NF repository function (NRF), and defining, as part of the first NF profile, alternate NF instance information identifying at least one individual alternate NF instances to function as backups in response to unavailability of the first NF instance and, for each alternate NF instance, a priority attribute value indicating a relative priority of the alternate NF instance with respect to the other alternate NF instance.

Accordingly, in light of these and other difficulties, there exists a need for improved methods, systems, and computer readable media for prioritizing among alternate SCP or other NF instances.

SUMMARY

A method for prioritizing among alternate network function NF instances includes registering a first NF profile of a first NF instance with a first NRF, and defining, as part of the first NF profile, alternate NF instance information identifying a plurality of individual alternate NF instances to function as backups in response to unavailability of the first NF instance and specifying, for each alternate NF instance, a priority attribute value indicating a relative priority of the alternate NF instance with respect to the other alternate NF instances. The method further includes at a first consumer NF or SCP, discovering, from the first NRF, the first NF profile of the first NF instance, detecting unavailability of the first NF instance, and, using the alternate NF instance information in the first NF profile to select and contact one of the alternate NF instances identified by the alternate NF instance information.

According to another aspect of the subject matter described herein, the method for prioritizing among alternate NF instance includes registering a second NF profile of a second NF instance with a second NRF, and defining, as part of the second NF profile, alternate NF instance information identifying a plurality of individual alternate NF instances to function as backups in response to unavailability of the second NF instance and, specifying, for each alternate NF instance, a priority attribute value indicating a relative priority of the alternate NF instance with respect to the other alternate NF instances specified for the NF profile of the second NF instance.

According to another aspect of the subject matter described herein the first and second NF instances are members of an NF set and the alternate NF instance information in the first NF profile identifies the second NF instance as an alternate for the first NF instance and the alternate NF instance information in the second NF profile identifies the first NF instance as an alternate for the second NF instance.

According to another aspect of the subject matter described herein, registering the first NF profile includes registering a first SCP profile of a first SCP instance, defining the alternate NF instance information includes defining alternate SCP instance information identifying a plurality of alternate SCP instances as part of the first SCP profile, discovering the first NF profile includes discovering the first SCP profile, and using the alternate NF instance information includes using the alternate SCP instance information in the first SCP profile to select and contact an alternate SCP instance.

According to another aspect of the subject matter described herein, registering the first NF profile includes registering a first NF profile of a first producer NF instance, defining the alternate NF instance information includes defining the alternate NF instance information identifying a plurality of alternate producer NF instances as part of the first NF profile, discovering the first NF profile includes discovering the first NF profile of the first producer NF instances, and using the alternate NF instance information includes using the alternate NF instance information in the NF profile to contact one of the alternate producer NF instances.

According to another aspect of the subject matter described herein, using the alternate NF instance information to select and contact one of the alternate NF instances includes selecting the alternate NF instance using the priority attribute values specified for the alternate NF instances and/or capacity values specified for the alternate NF instances.

According to another aspect of the subject matter described herein, the priority for the at least one NF instance comprises a priority attribute value separate from an NF profile level priority attribute value for the first NF instance.

According to another aspect of the subject matter described herein, the alternate NF instance information includes, for each of the alternate NF instances, at least one of: an NF instance identifier; and a fully qualified domain name (FQDN) and a locality.

According to another aspect of the subject matter described herein, the alternate NF instance information for each of the alternate NF instances includes the NF instance identifier that identifies an individual SCP instance or an individual producer NF instance and the FQDN and the locality of the individual SCP or individual producer NF instance.

According to another aspect of the subject matter described herein, the alternate NF instance information identifies, using the priority attribute values specified for the alternate NF instances, at least a secondary NF instance and a tertiary NF instance to function as alternates for the first NF instance.

According to another aspect of the subject matter described herein, a system for prioritizing among alternate network function (NF) instances is provided. The system includes a first NF instance for registering a first NF profile of the first NF instance with a first NF repository function (NRF), and defining, as part of the first NF profile, alternate NF instance information identifying a plurality of individual alternate NF instances to function as backups in response to unavailability of the first NF instance and specifying, for each alternate NF instance, a priority attribute value indicating relative priority of the alternate NF instance with respect to the other alternate NF instances. The system further includes a first consumer NF or SCP for discovering, from the first NRF, the first NF profile of the first NF instance, detecting unavailability of the first NF instance, and, using the alternate NF instance information in the first NF profile to contact one of the alternate NF instances identified by the alternate NF instance information.

According to another aspect of the subject matter described herein, the system for prioritizing among alternate NF instances includes a second NF instance for registering a second NF profile of the second NF instance with a second NRF, and defining, as part of the second NF profile, alternate NF instance information identifying a plurality of individual alternate NF instances to function as backups in response to unavailability of the second NF instance and, for each alternate NF instance, a priority attribute value indicating a relative priority of the alternate NF instance with respect to the other alternate NF instances specified for the NF profile of the second NF instance.

According to another aspect of the subject matter described herein, the first and second NF instances are members of an NF set and the alternate NF instance information in the first NF profile identifies the second NF instance as an alternate for the first NF instance and the alternate NF instance information in the second NF profile identifies the first NF instance as an alternate for the second NF instance.

According to another aspect of the subject matter described herein, the first NF instance comprises a first SCP instance, the first NF profile comprises a first SCP profile, and the alternate NF instance information defines identifies a plurality of alternate SCP instances as part of the first SCP profile.

According to another aspect of the subject matter described herein, the first NF instance comprises a first producer NF instance, the first NF profile comprises an NF profile of the first producer NF instance, and the alternate NF instance information identifies a plurality of alternate producer NF instances as part of the first NF profile.

According to another aspect of the subject matter described herein, the consumer NF or SCP is configured to use the alternate NF instance information to select and contact one of the alternate NF instances by selecting the alternate NF instance using the priority attribute values specified for the alternate NF instances and/or capacity attribute values specified for the alternate NF instances.

According to another aspect of the subject matter described herein, the alternate NF instance information includes, for each of the alternate NF instance, at least one of: an NF instance identifier; and a fully qualified domain name (FQDN) and a locality.

According to another aspect of the subject matter described herein, the alternate NF instance information for each of the alternate NF instances includes the NF instance identifier, which identifies an individual SCP instance or an individual producer NF instance, and the FQDN and the locality of the individual SCP or individual producer NF instance.

According to another aspect of the subject matter described herein, the alternate NF instance information identifies, using the priority attribute values specified for the alternate NF instances, at least a secondary NF instance and a tertiary NF instance to function as alternates for the first NF instance and specifies a priority attribute value for each alternate NF instance.

According to another aspect of the subject matter described herein, one or more non-transitory computer readable media having stored thereon executable instructions that when executed by one or more processors of one or more computers control the one or more computers to perform steps are provided. The steps include registering a first NF profile of a first network function (NF) instance with a first NF repository function (NRF), and defining, as part of the first NF profile, alternate NF instance information identifying a plurality of individual alternate NF instances to function as backups in response to unavailability of the first NF instance and specifying, for each alternate NF instance, a priority attribute value indicating a relative priority of the alternate NF instance with respect to the other alternate NF instances. The steps further include, at a first consumer NF or SCP, discovering, from the first NRF, the first NF profile of the first NF instance, detecting unavailability of the first NF instance, and, using the alternate NF instance information in the first NF profile to select and contact one of the alternate NF instances identified by the alternate NF instance information.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
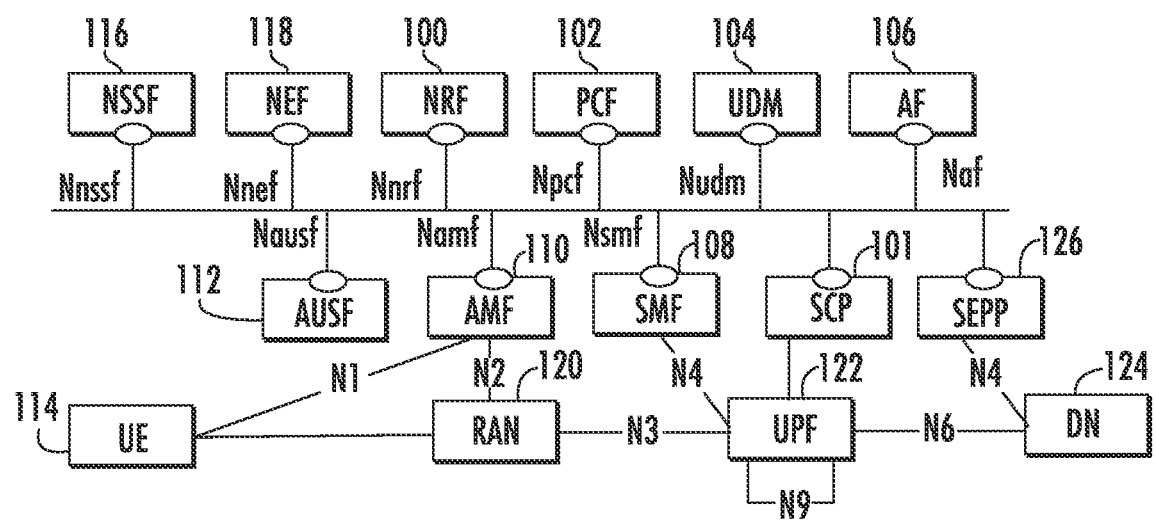
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs.

NRF 100 is a repository for NF profiles of producer NF instances and SCP profiles of SCP instances. In order to communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the type of service provided, capacity of the NF instance, and information for contacting the NF instance. The SCP profile is an NF profile with parameters specific to an SCP instance. Similarly, since an SCP is a specific type of NF instance, the term "NF instance" refers to SCP instances as well as any of the other NF instance types described herein.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a user defined management (UDM) 104 that manages user data, and an application function (AF) 106 that provides application services.

The NFs illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN.

As stated above, one problem that can occur in 5G and other networks is that there is not an effective way defined in 3GPP standards to specify primary, secondary, tertiary, etc. relationships among NF instances, including SCP instances. 3GPP Release 16 defines the SCP for 5G SBI indirect communication model C and model D. 3GPP TS 29.510 Release 16, Section 6.1.6.2.2 defines the NF profile, which can be used by 5GC NFs, such as SCPs, SEPPs, etc., to register with the NRF. SCP-specific information can be defined/published as per the 3GPP TS 29.510 Release 16 Section 6.1.6.2.6.5 ScpInfo data model. However, neither the NF profile nor the SCPInfo data model provides a mechanism for defining an order in which SCP or producer NF instances should be contacted in the event of a failure of one of the NF instances.

Network operators may choose to deploy the SCP or other NF instances in a geo-redundant deployment. NFs that are geo-redundantly deployed may register with the NRF specifying the same NF-Set id to have high availability, resiliency in the network to mitigate SCP and other NF instance failure scenarios. Operators may also want to deploy primary, secondary and tertiary SCP instances for 5GC consumers, e.g., SCPs deployed in other sites, in cases where 5G SBI indirect communication involves more than one SCP instance. 3GPP standards do not provide a mechanism for prioritization between available backup SCP or other NF instances in the case of a particular SCP or producer NF instance (from a geo-redundant SCP or other producer NF deployment or SCP set or other NF set) failure.

It should be noted that the NF priority specified in the NF profile is global and does not solve this problem. There is a need to define priority relationships among alternate SCP instances when a primary SCP instance becomes unavailable. The subject matter described herein includes a mechanism for 5GC consumers (e.g., SCPs) to prioritize among available backup SCP or other producer NF instances in the case where a primary SCP or other producer NF instance fails by defining the primary, secondary and tertiary relationship between the mate (alternate) SCP or other producer NF instances for each SCP instance in a geo-redundant SCP deployment or SCP set when registering with the NRF.

In the examples below, an SCP specifies one or more backup SCP instances as part of the SCP profile of the SCP that is registered with the NRF. It is understood that backup NF instances can be specified for other producer NF types without departing from the scope of the subject matter described herein.

SCP discovery and selection is defined in Section 6.3.6 of 3GPP TS 23.501. According to 3GPP TS 23.501, an NF is configured with its serving SCP(s). In a deployment where several SCPs are deployed, a message may traverse several SCP instances before reaching its final destination. An SCP may discover and select a next hop SCP by querying the Nnrf_NFDiscovery service of the NRF, or the SCP may be configured with information for contacting the next hop SCP in the message path. An SCP may use the SCP profile parameters as discovery parameters in Nnrf_NFDiscovery to discover another SCP. The parameter(s) to be used depend(s) on network deployment. The NRF returns a list of SCP profiles as per the provided discovery parameters.

If an SCP receives a routing binding indication within a service or notification request and decides to forward that request to a next-hop SCP, the forwarding SCP includes the routing binding indication in the forwarded request. It is up to SCP implementation, deployment specific configuration, and operator policies as to how the SCP will use information retrieved from the NRF to resolve the optimal route to a producer. Based on SCP configuration, an SCP deciding to address a next-hop SCP for a service request may then delegate the NF (instance) and/or service (instance) selection to subsequent SCPs and provide discovery and selection parameters to the next-hop SCP.

One point to highlight is that 3GPP does not provide an SCP reselection mechanism with prioritization among available backup SCP instances in case of a particular SCP instance (from a geo-redundant SCP deployment or SCP set) failure. As a result, there is a need to define the primary, secondary and tertiary relationships among the SCP instances for each NF instance from a geo-redundant SCP deployment or SCP set.

As per 3GPP TS 23.501, Section 6.2.6.3, an SCP profile maintained in an NRF includes the following information:
  SCP ID
  Fully qualified domain name (FQDN) or IP address of the SCP
  Indication that the profile is of an SCP (e.g. NF type parameter set to type SCP).
  SCP capacity information.
  SCP load information.
  SCP priority.
  Location information for the SCP.
  Served location(s) (see servingScope in 3GPP 29.510).
  Network slice related identifier(s), e.g., single network slice selection assistance information (S-NSSAI), network slice instance (NSI) ID.
  Remote PLMNs reachable through the SCP.
  Endpoint addresses accessible via the SCP.
  NF sets of NFs served by the SCP.
  SCP domain to which the SCP belongs. If an SCP belongs to more than one SCP domain, the SCP will be able bridge these domains, i.e., by sending messages between these domains.

It should be noted that the SCP profile level priority attribute allows prioritization among all SCP instances, but this attribute is not specific to any failed SCP instance. The SCP profile level priority attribute is a global priority attribute. 3GPP does not provide a mechanism/attribute in the SCP profile regarding prioritization among available backup SCP instances in case of a particular SCP instance (from a geo-redundant SCP deployment or SCP set) failure. As a result, there is a need to define the primary, secondary, and tertiary relationships among the SCP instances for each NF instance from a geo-redundant SCP deployment or SCP set.

As per 3GPP TS 23.501, Section 6.2.6.2, the NF profile of an NF instance maintained in an NRF includes the following information:
  NF instance ID.
  NF type.
  PLMN ID.
  Network slice related identifier(s) e.g. S-NSSAI, NSI ID.
  FQDN or IP address of the NF instance.
  NF capacity information.
  NF priority information.
  NF set ID.
  NF service set ID of the NF service instance.
  NF specific service authorization information.
  Endpoint address(es) of instance(s) of each supported service.
  Identification of stored data/information.
  Location information for the NF instance.
  Tracking area identifiers (TAI(s)).
  NF load information.
  Routing indicator, for UDM and AUSF.
  One or more globally unique AMF IDs (GUAMI(s)), in the case of an AMF.
  SMF area identity(ies) in the case of a UPF.

UDM group ID, range(s) of subscription permanent identifiers (SUPIs), range(s) of generic public subscription identifiers (GPSIs), range(s) of internal group identifiers, range(s) of external group identifiers for a UDM.

UDR group ID, range(s) of SUPIs, range(s) of GPSIs, range(s) of external group identifiers for a UDR.

AUSF group ID, range(s) of SUPIs for an AUSF.

PCF group ID, range(s) of SUPIs for a PCF.

HSS group ID, set(s) of IMPIs, set(s) of IMPU, set(s) of international mobile subscriber identifiers (IMSIs), set(s) of PSIs, set(s) of mobile subscriber integrated services digital network (MSISDN) numbers for home subscriber servers (HSSs).

Supported analytics ID(s), network data analytics function (NWDAF) serving area information (i.e. list of TAIs for which the NWDAF can provide analytics), if available, in the case of an NWDAF.

Range(s) of external identifiers, or range(s) of external group identifiers, or the domain names served by a network exposure function (NEF).

Additional information about NF profile attributes can be found in 3GPP TS 29.510, Section 6.1.6.2.2.

Like the priority attribute defined for the SCP profile, the priority attribute defined for the NF profile allows prioritization among all NF instances and it is not specific to any failed NF instance (e.g. an SCP). 3GPP does not provide a mechanism/attribute in the NF profile regarding prioritization between available backup NF instances (e.g., an SCP) in the case of a particular NF instance (from a geo-redundant NF deployment or NF set) failure. As a result, there is a need to define the primary, secondary and tertiary relationships among the SCP instances for each SCP instance from a geo-redundant SCP deployment or SCP set.

To enhance network reliability, operators prefer to deploy 5GC NF instances in geo-redundant sites. One example of an NF instance that an operator may geo-redundantly deploy is an SCP instance. Operators may wish to implement SCP geo-redundant deployment with primary, secondary and tertiary relationship among the SCP instances for each SCP instance from a geo-redundant SCP deployment (or SCP set), but there is no 3GPP-defined mechanism for implementing such relationships. An SCP or consumer NF is not able to prioritize among available backup SCP instances in the case of a particular SCP instance from a geo-redundant SCP deployment or SCP set failure, as there is no 3GPP-defined mechanism to define the primary, secondary and tertiary relationship among the SCP instances for each SCP instance from a geo-redundant SCP deployment or SCP set The problem is further illustrated in FIG. 2.

Figure 2:
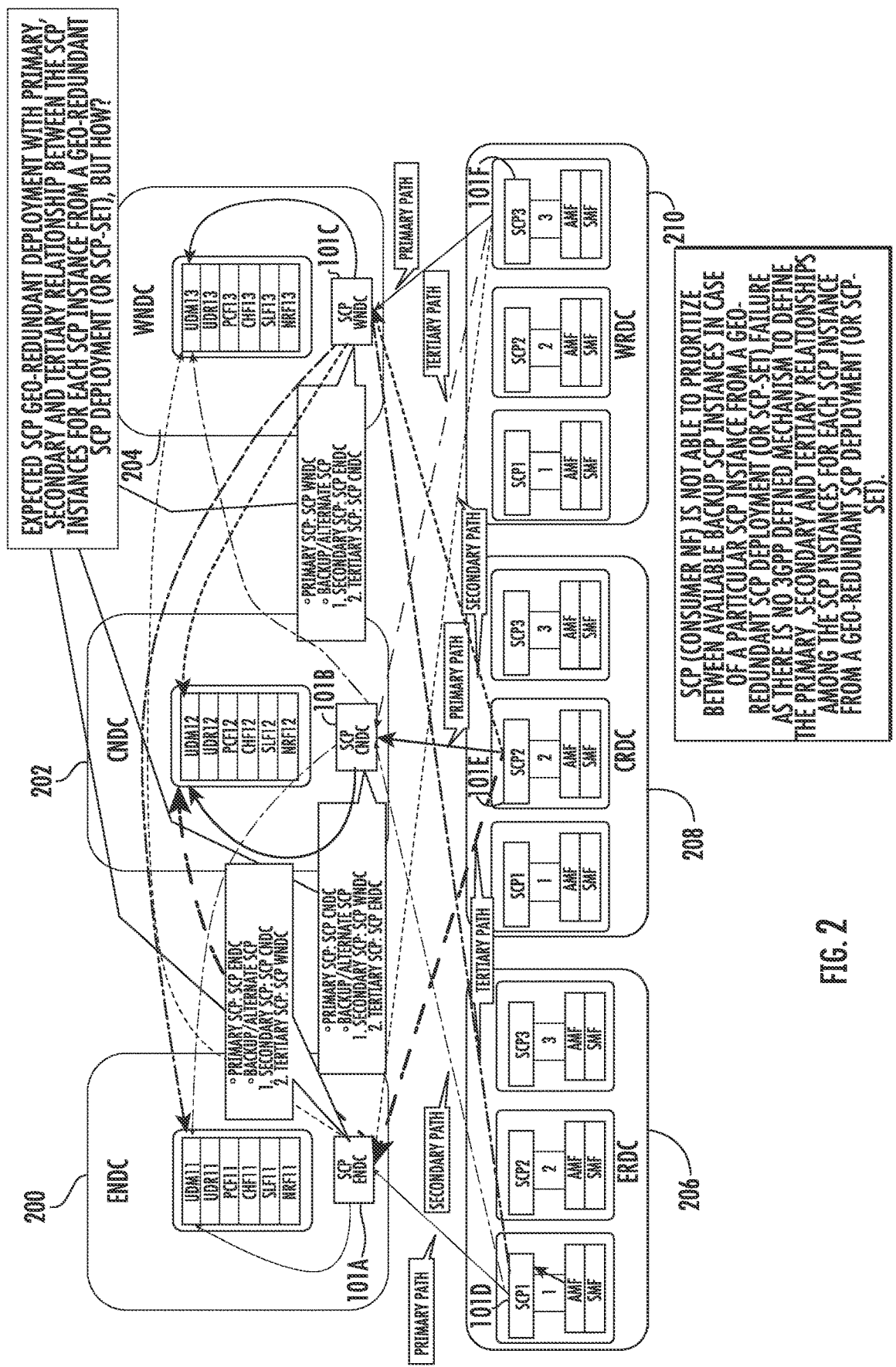
FIG. 2 is a network diagram illustrating a geo-redundant SCP deployment and desired per-SCP priority relationships for each SCP site.

In FIG. 2, the network includes an eastern network data center (ENDC) 200, a central network data center (CNDC) 202 and a western network data center (WNDC) 204. In addition, the network includes an eastern regional data center (ERDC) 206, a central regional data center (CRDC) 208, and a western regional data center (WRDC) 210. Eastern network data center 200 includes an SCP instance 101A. Central network data center 202 includes an SCP instance 101B. Western network data center 204 includes an SCP instance 101C. SCP instances 101A, 101B, and 101C form a geo-redundant SCP set.

It may be desirable to define different primary, secondary and tertiary relationships among SCP instances 101A, 101B, and 101C from the perspective of SCPs or other NF service consumers located in regional data centers 206, 208, and 210. For example, for SCP instance 101D located in eastern regional data center 206, it may be desirable to define SCP instance 101A as primary, SCP instance 101B as secondary, and SCP instance 101C as tertiary. For SCP instance 101D located in central regional data center 208, it may be desirable to define SCP instance 101B as primary, SCP instance 101C as secondary, and SCP instance 101A as tertiary. For SCP instance 101E located in western regional data center 210, it may be desirable to define SCP instance 101C as primary, SCP instance 101A as secondary, and SCP instance 101C as tertiary. The 3GPP defined priority attribute for NF profiles does not allow such prioritization to be defined on a per-consumer NF instance basis.

To implement the desired priority relationships described above with respect to FIG. 2, an SCP or other NF may publish mate (alternate) SCP or NF relationships during SCP or NF registration with the NRF as mateSCPInfo or mateNFInfo attributes, including priority and capacity, as part of the NF profile or the SCP profile. In an SCP-specific example, the SCP registers with the NRF and publishes its mate (alternate) SCP instance(s) relationships, including priority and capacity as follows:

custom Info
    Mate SCP info (mated (alternate) SCP info, as an array or list). The mate SCP info may include, for each mated or alternate SCP, the following attributes:
        mate SCP locality, which identifies the locality of the mated SCP instance
        mate SCP instance ID, which identifies the NF instance ID of the SCP instance
        mate SCP FQDN, which identifies the FQDN of the mate SCP instance
        priority, which specifies priority among mate or alternate SCP instances
        capacity, which specifies capacity of each alternate or mate SCP instance Mate SCP instance(s) will be discovered by reading the nfSetIdList info in the NF profile or the SCP profile of the primary NF instance or SCP instance. The mate SCP info may be used to assign/override NF level priority and capacity of mate (alternate) SCP instance(s) in the case of SCP instance failure of a registered SCP. For example, SCP instance A may publish mate SCP info with SCP instance B as one mate with a mate SCP level priority attribute value of 1 and SCP instance C as another mate with a mate SCP level priority attribute value of 2. SCP instance B may publish its NF or SCP profile with an NF or SCP profile level priority of 1, and SCP instance C may publish its NF or SCP profile with an NF or SCP profile level priority of 2. If SCP instance A fails, a consumer NF or SCP that discovers the NF or SCP profile of SCP instance A may first attempt to contact SCP instance B as the secondary SCP instance based on the SCP info level priority of 1 and then contact SCP instance C as the tertiary SCP instance based on the SCP info level priority of 2, thereby ignoring or overriding the NF or SCP profile level priority attributes of SCP instance A and SCP instance B.

A complete list of NF and SCP profile attributes can be found in 3GPP TS 29.510 R16 Section 6.1.6.2.2 for the NF profile and 6.1.6.2.6.5 for ScpInfo. An SCP profile may include the following parameters:

nfType: SCP or CUSTOM_ORACLE_SCP
nfSetIdList—List of mated SCP instances. All mated SCP instances shall have the same nfSetIdList.
fqdn
ipv4Addresses
Ipv6Addresses
priority
capacity
locality: Location of the SCP instance servingScope: Localities served by the SCP instance
scpInfo
scpPrefix
scpPorts
custom Info
Mate SCP Info (mated pair SCP info)
mateSCPLocalities
locality of mated pair SCP instance(s)
SCP Id
SCP FQDN
Priority
Capacity Table 1 shown below illustrates exemplary NF or SCP profile attributes. The attributes listed in bold font are the SCP info profile attributes that may be specified for alternate SCP instances.

TABLE 1

| Attribute name | Data type | P | Cardinality |
|---|---|---|---|
| NF or SCP Profile Attributes | | | |
| nfInstanceId | NfInstanceId | M | 1 |
| nfType | NFType | M | 1 |
| nfStatus | NFStatus | M | 1 |
| nfInstanceName | string | O | 0 . . . 1 |
| heartBeatTimer | integer | C | 0 . . . 1 |
| plmnList | array(PlmnId) | C | 1 . . . N |
| snpnList | array(PlmnIdNid) | C | 1 . . . N |
| sNssais | array(ExtSnssai) | O | 1 . . . N |
| perPlmnSnssaiList | array(PlmnSnssai) | O | 1 . . . N |
| nsiList | array(string) | O | 1 . . . N |
| fqdn | Fqdn | C | 0 . . . 1 |
| interPlmnFqdn | Fqdn | C | 0 . . . 1 |
| priority | integer | O | 0 . . . 1 |
| capacity | integer | O | 0 . . . 1 |
| load | integer | O | 0 . . . 1 |

TABLE 1-continued

| Attribute name | Data type | P | Cardinality |
|---|---|---|---|
| NF or SCP Profile Attributes | | | |
| loadTimeStamp | DateTime | O | 0 . . . 1 |
| locality | string | O | 0 . . . 1 |
| customInfo | object | O | 0 . . . 1 |
| nfServices | array(NFService) | O | 1 . . . N |
| nfServiceList | map(NFService) | O | 1 . . . N |
| nfSetIdList | array(NfSetId) | C | 1 . . . N |
| servingScope | array(string) | O | 1 . . . N |
| scpDomains | array(string) | O | 1 . . . N |
| scpInfo | ScpInfo | O | 0 . . . 1 |

Tables 2 and 3 shown below illustrate the mate SCP info attribute and other mate SCP attributes in more detail:

TABLE 2

| Attribute Name | Data Type | P | Cardinality | Description |
|---|---|---|---|---|
| Mate SCP Info Attribute | | | | |
| Mate SCP info | array(MateSCPInfo) | O | 1 . . . N | locality of mated pair SCP instance(s) If not present then learn from servingScope of mate SCP instances of SCP-Set (i.e. nfset). |

TABLE 3

| Attribute Name | Data Type | P | Cardinality | Description |
|---|---|---|---|---|
| Mate SCP Attribute Values | | | | |
| mateSCPLocalities | Array(string) | O | 1 . . . N | locality of mated pair SCP instance(s). At least one of the mateSCPLocalities, scpInstanceId or scpfqdn attributes should be present. If more than one attribute is present then SCP shall consider in the following preference order: scpInstanceId, scpfqdn and mateSCPLocalities |
| scpInstanceId | NfIndtanceID | O | 0 . . . 1 | Unique SCP instance Id (UUID format). (See Note 1) At least one of the mateSCPLocalities, scpInstanceId or scpfqdn attributes should be present. If more than one attribute is present then SCP shall consider in following preference order: |

TABLE 3-continued

Mate SCP Attribute Values

| Attribute Name | Data Type | P | Cardinality | Description |
|---|---|---|---|---|
| scpfqdn | fqdn | O | 0 . . . 1 | Fqdn of SCP. (See Note 1) At least one of the mateSCPLocalities, scpInstanceId or scpfqdn attributes should be present. If more than one attribute is present then SCP shall consider in the following preference order: scpInstanceId, scpfqdn and mateSCPLocalities. |
| priority | integer | O | 0 . . . 1 | Priority (relative to other mate SCP instance) in the range of 0-65535. |
| capacity | integer | O | 0 . . . 1 | Static capacity information in the range of 0-65535, expressed as a weight relative to other mate SCP instance. |

Figure 3:
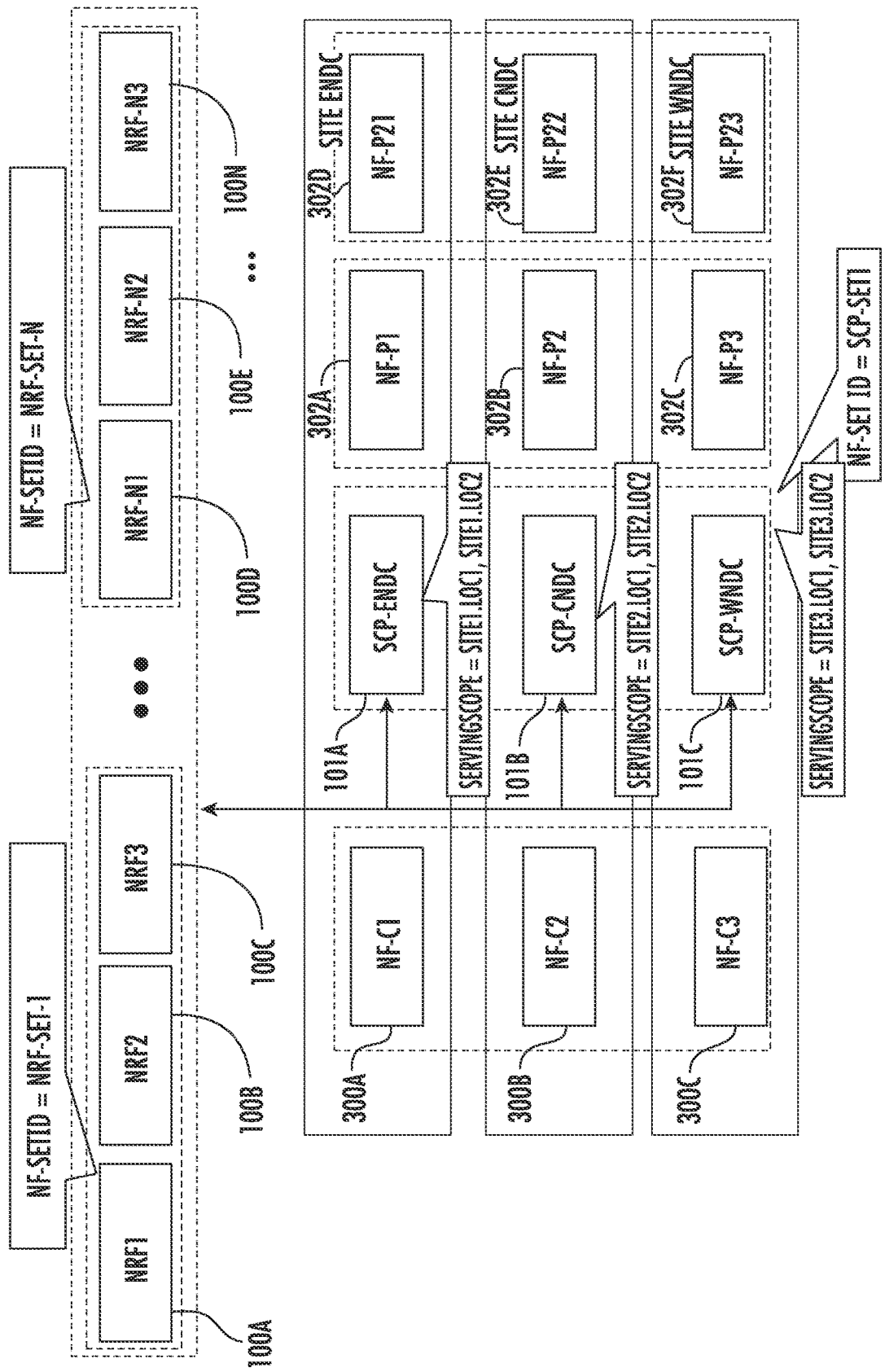
FIG. 3 is a network diagram illustrating NRFs, SCPs, and producer NFs deployed at different sites.

FIG. 3 is a network diagram illustrating exemplary network functions associated with registering and discovering alternate NF and SCP instances with priorities defined in the NF or SCP profile of a primary NF or SCP instance. Referring to FIG. 3, the network includes SCPs 101A, 101B, and 101C respectfully associated with the eastern network data center, the central network data center, and the western network data center. The network further includes NRFs 100A-100N that form N NRF sets. The network further includes consumer NF instances 300A-300C and producer NF instances 302A-302F.

Each of SCP instances 101A-101C registers with any available NRF instance (100A-100N) (as per priority, capacity) in each configured NRF set as an SCP or custom NF type using an operator configurable SCP profile configuration. In each registration, the locality attribute is populated as the location of the SCP instance. Localities served by each SCP instance are populated in the servingScope attribute. The following is an example of the NF or SCP profile that may be registered by SCP instance 101A. In the NF profile, the custom information containing attributes of backup SCPs is indicated in bold font.

```
{"nfInstanceId": "SCP-ENDC",
 "nfType": "CUSTOM_ORACLE_SCP" or "SCP",
 "nfSetIdList": [scp-set1],
 "fqdn": "SCP-ENDC.oper1.com",
 "locality"="site-ENDC.Loc1",
 "servingScope"=["site-ENDC.loc1",...,"site-ENDC.locN"]
 "customInfo":
    {
    "mateSCPInfo"=[
      {"scpInstanceId"="SCP-CNDC"
       "scpFqdn"="SCP-CNDC.oper1.com",
       "mateSCPLocalities"=[site-CNDC.loc1]
       "priority": 1
```

```
       "capacity": 100
      }
      {"scpInstanceId"="SCP-WNDC"
       "scpFqdn"="SCP-WNDC.oper1.com",
       "mateSCPLocalities"=[site-WNDC.loc1]
       "priority": 2
       "capacity": 100
      }]
    }
}
```

It can be seen from the NF profile attribute values registered by SCP instance 101A that the SCP in the central network data center is defined as the secondary SCP (priority 1) and the SCP in the western network data center is the tertiary SCP (priority 2).

The following is an example of NF profile attributes that may be registered by SCP instance 101B:

```
{"nfInstanceId": "SCP-CNDC",
 "nfType": "CUSTOM_ORACLE_SCP" or "SCP",
 "nfSetIdList": [scp-set1],
 "fqdn": "SCP-CNDC.oper1.com",
 "locality"="site-CNDC.Loc1",
 "servingScope"=["site-CNDC.loc1",...,"site-ENDC.locN"]
 "customInfo":
    {
    "mateSCPInfo"=[
      {"scpInstanceId"="SCP-WNDC"
       "scpFqdn"="SCP-WNDC.oper1.com",
       "mateSCPLocalities"=[site-WNDC.loc1]
       "priority": 1
       "capacity": 100
      }
      {"scpInstanceId"="SCP-ENDC"
       "scpFqdn"="SCP-ENDC.oper1.com",
       "mateSCPLocalities"=[site-ENDC.loc1]
```

```
        "priority": 2
        "capacity": 100
    }]
  }
}
```

It can be seen from the NF profile attribute values registered by SCP instance 101B that the SCP instance in the western network data center is defined as the secondary SCP (priority 1) and the SCP instance in the eastern network data center is the tertiary SCP (priority 2).

The following is an example of NF or SCP profile attributes that may be registered by SCP instance 101C:

```
{"nfInstanceId": "SCP-WNDC",
 "nfType": "CUSTOM_ORACLE_SCP" or "SCP",
 "nfSetIdList": [scp-set1],
 "fqdn": "SCP-WNDC.oper1.com",
 "locality"="site-WNDC.Loc1",
 "servingScope"=["site-WNDC.loc1",...,"site-WNDC.locN"]
 "customInfo":
 {
    "mateSCPInfo"=[
        {"scpInstanceId"="SCP-ENDC"
          "scpFqdn"="SCP-ENDC.oper1.com",
          "mateSCPLocalities"=[site-ENDC.loc1]
              "priority": 1
              "capacity": 100
        }
        {"scpInstanceId"="SCP-CNDC"
          "scpFqdn"="SCP-CNDC.oper1.com",
          "mateSCPLocalities"=[site-CNDC.loc1]
              "priority": 2
              "capacity": 100
        }]
  }
}
```

It can be seen from the NF profile attribute values registered by SCP instance 101C that the SCP instance in the eastern network data center is defined as the secondary SCP (priority 1) and the SCP instance in the central network data center is the tertiary SCP (priority 2).

Each of SCP instances 101A-101C can also update its NF or SCP profile as needed. Examples of changes that will require updates include any change in 5G NF localities which will be served by an SCP instance, such as a new locality being added to serving localities or an existing locality being deleted from serving localities. Another example of a change that will trigger an NF or SCP profile update includes any change in mated (alternate) SCP info (scpInfo), such as a new mated (alternate) site SCP instance being added or deleted. To delete an SCP instance, the SCP instance being deleted deregisters itself with the NRF and notifies other SCP instances in the network.

In order to make sure that the SCP has the latest network topology information, an SCP, such as SCPs 101D, 101E, and 101F illustrated in FIG. 2, subscribes for any NF status change notification for all 5GC NF types (including SCPs) with any one available NRF instance (as per priority, capacity) in each configured NRF set using NFStatusSubscribe, NFStatusUnsubscribe and NFStatusNotify service operations of the Nnrf_NFManagement service. Each SCP instance may also perform a periodic 5G NF topology audit with any one available NRF instance (as per priority, capacity) in each configured NRF set using the Nnrf_NFManagement or Nnrf_NFDiscovery operation.

Figure 4:
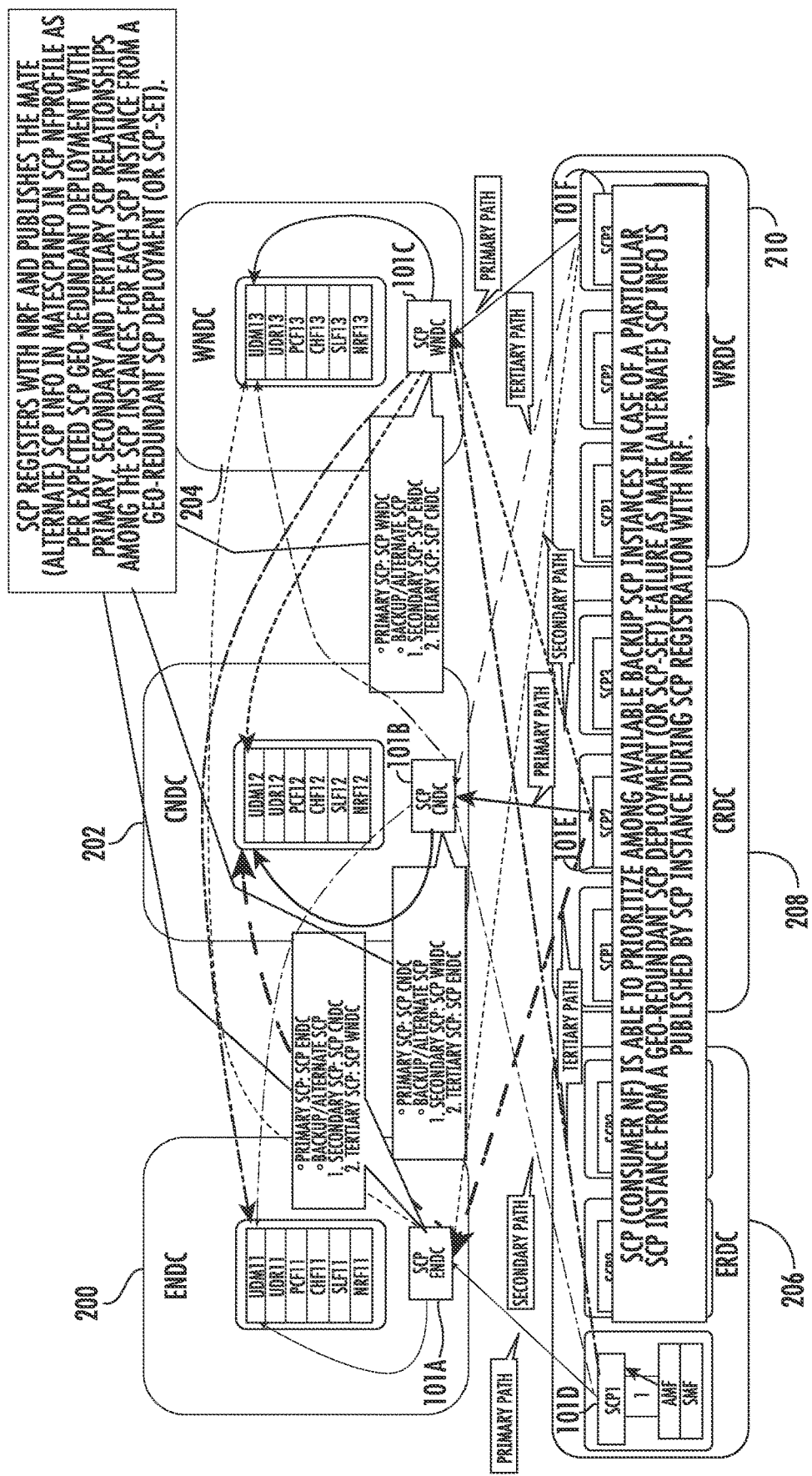
FIG. 4 is a network diagram illustrating a geo-redundant SCP deployment and priority relationships among SCPs at different sites.

FIG. 4 is a network diagram illustrating the same network as FIG. 2 except that SCPs and other NF service consumers are able to access alternate SCP instances in the case of a failure of a primary SCP instance, where the priority order for contacting the alternate SCP instances is defined by each primary SCP (i.e., the SCP performing the NF register service operation) during NF registration. In FIG. 4, each of SCP instances 101A, 101B, and 101C registers with an NRF and publishes alternate SCP information in the mateSCPInfo attribute of their respective SCP profiles. SCP instance 101D discovers the NF profile of SCP instance 101A, including its mateSCPInfo, SCP instance 101E discovers the SCP profile of SCP instance 101B including its mateSCPInfo, and SCP instance 101F discovers the SCP profile of SCP instance 101C including its mateSCPInfo. Because each of SCP instances 101A, 101B, and 101C defines its respective alternate SCP relationships using the mateSCPInfo in the SCP profile, different SCPs can have different alternate SCP instances with different priorities. Also, because the SCP instances specified as alternates in the mateSCPInfo override SCP or NF profile level priorities, the priority relationships specified in the mateSCPInfo can be independent from the SCP or NF profile level priorities.

Figure 5:
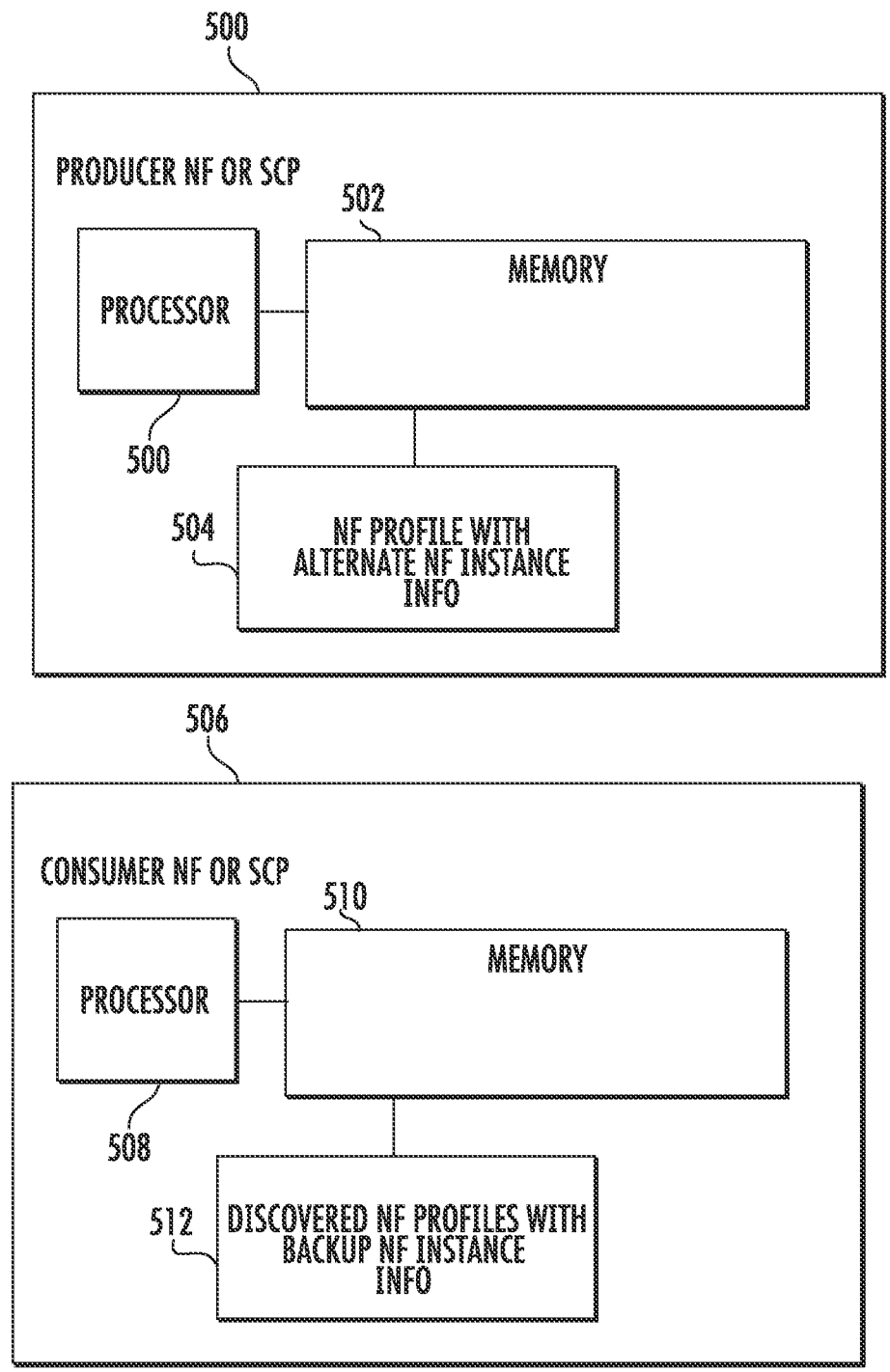
FIG. 5 is a block diagram illustrating an exemplary architecture for prioritizing among alternate NF instances.

FIG. 5 is a block diagram illustrating an exemplary architecture for a producer NF or SCP and a consumer NF or SCP for implementing prioritization among backup NF instances. Referring to FIG. 5, a producer NF or SCP 500 includes at least one processor 502 and a memory 504. Producer NF or SCP instance 500 is configured with an NF profile 506 that includes backup SCP instance information identifying one or more backup SCP instances and specifying priorities among the backup SCP instances in the event of unavailability of producer NF or SCP 500. Producer NF or SCP instance 500 registers NF profile 504 with an NRF so that the NF profile can be discovered by consumer NF and SCP instances.

A consumer NF or SCP 506 also includes at least one processor 508 and a memory 510. Consumer NF or SCP 506 performs service discovery with an NRF and obtains discovered NF profiles 512. At least some of discovered NF profiles 512 include backup NF instance information. When consumer NF or SCP 506 detects unavailability of a producer NF or SCP serving consumer NF or SCP 506, consumer NF or SCP 506 may read the backup NF instance information in the NF profile and contact the backup NF or SCP instances in the priority order specified by the backup NF instance information in the NF profile.

Figure 6:
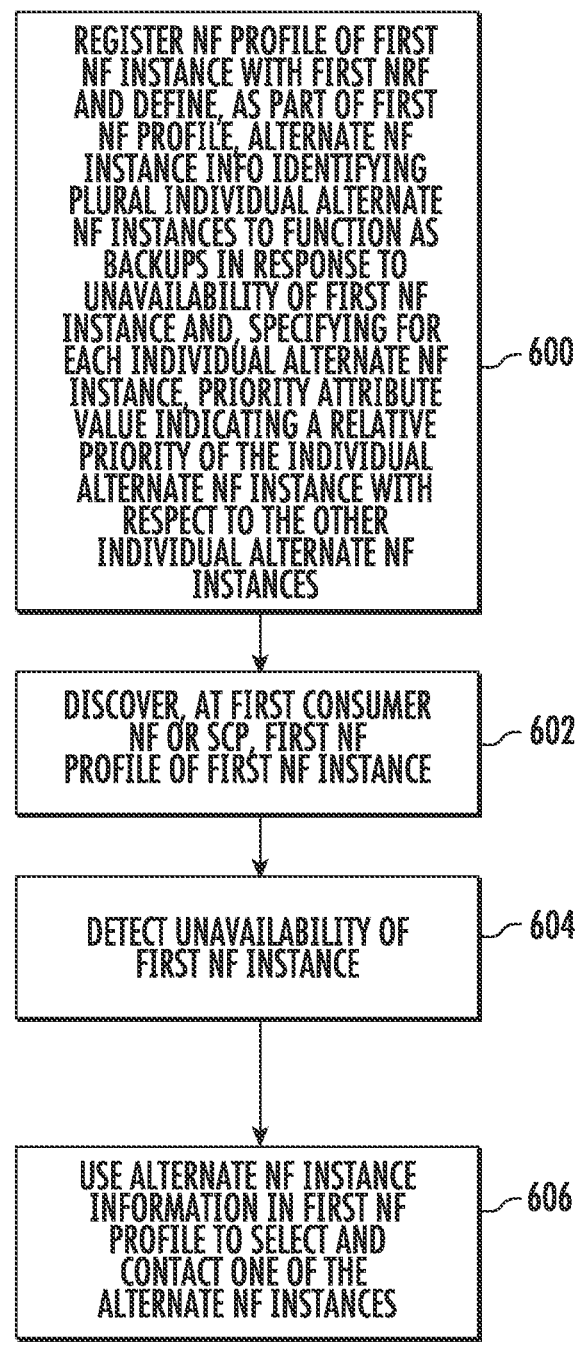
FIG. 6 is a flow chart illustrating an exemplary process for prioritizing among alternate NF instances.

FIG. 6 is a flow chart illustrating an exemplary process for prioritizing among alternate network function (NF) instances. Referring to FIG. 6, in step 600, the process includes registering a first NF profile of a first NF instance with a first NF repository function (NRF), and defining, as part of the first NF profile, alternate NF instance information identifying a plurality of individual alternate NF instances to function as backups in response to unavailability of the first NF instance and specifying, for each alternate NF instance, a priority attribute value indicating a relative priority of the alternate NF instance with respect to the other alternate NF instances. For example, and SCP or a producer NF may register its NF or SCP profile with an NRF and define, as part of the NF or SCP profile, one or more individual backup NF or SCP instances by including the mateSCPInfo attributes described above, which includes SCP instance IDs and priorities of the SCP instances usable to decide the order for contacting the individual backup SCP instances when the registering or primary SCP fails.

In step 602, the process further includes, at a first consumer NF or SCP, discovering, from the first NRF, the first NF profile of the first NF instance. For example, a consumer NF or an SCP performing delegated discovery may use the NF discovery service operation to discover, from an NRF, the NF or SCP profile of a producer NF or SCP.

In step 604, the process further includes detecting unavailability of the first NF instance. For example, an NF consumer or SCP that discovered a producer NF instance or SCP may receive an error response or fail to receive a response from the producer NF or SCP within a response timeout period. Either of these occurrences may indicate unavailability of the producer NF or SCP.

In step 606, the process includes using the alternate NF instance information in the first NF profile to select and contact one of the alternate NF instances. For example, the consumer NF or SCP may read the mateSCPInfo in the NF or SCP profile of the unavailable producer NF or SCP and send an SBI request to the identified alternate producer NF or SCP of the highest priority (i.e., the producer NF or SCP with the lowest numeric value of the priority attribute in the mateSCPInfo portion of the NF or SCP profile). If the consumer NF or SCP receives a response from the alternate producer NF or SCP, the consumer NF or SCP may continue to communicate with the alternate producer NF or SCP. If the alternate producer NF or SCP fails, the consumer NF or SCP may attempt to contact the producer NF or SCP of the next highest priority specified by the priority attributes in the mateSCPInfo of the NF or SCP profile.

Exemplary advantages of the subject matter described herein include providing the ability for the SCP to register with the NRF and publish the mate (alternate) SCP info in the mateSCPInfo portion of the SCP profile or NF profile as per an expected SCP geo-redundant deployment with primary, secondary and tertiary SCP relationships between the SCP instances for each SCP instance from a geo-redundant SCP deployment (or SCP set). Consumer NFs or SCPs are able to use the alternate SCP information to prioritize between available backup SCP instances in the case of a particular SCP instance from a geo-redundant SCP deployment (or SCP set) failure as mate (alternate) SCP info is published by SCP instance during SCP registration with NRF. The ability to specify alternate SCP information in the SCP profile of a registering SCP provides for section of preferred mate (alternate) SCP instance(s) corresponding to each SCP instance in the geo-redundant SCP deployment. The subject matter described herein is not limited to registering alternate SCP information as part of the SCP profile of a registering SCP and can be extended to allow registering alternate producer NF profile information in an NF profile of a registering producer NF, including, but not limited to a PCF, BCF, NRF, NSSF, UDR, NEF, SEPP, etc.

The disclosure of each of the following references is incorporated herein by reference in its entirety.

REFERENCES 1. 3rd Generation Partnership Project; Technical Specification Group Core Network and Terminals; Numbering, addressing and identification; (Release 17) 3GPP TS 23.003 V17.3.0 (2021-09)
2. 3rd Generation Partnership Project; Technical Specification Group Services and System Aspects; System Architecture for the 5G System (5GS); Stage 2 (Release 17) 3GPP TS 23.501 V17.2.1 (2021-09)
3. 3rd Generation Partnership Project; Technical Specification Group Services and System Aspects; Procedures for the 5G System (5GS); Stage 2 (Release 17) 3GPP TS 23.502 V17.2.0 (2021-09)
4. 3rd Generation Partnership Project; Technical Specification Group Core Network and Terminals; Technical Realization of Service Based Architecture (5GS); Stage 3 (Release 17) 3GPP TS 29.500 V17.4.0 (2021-09)
5. 3rd Generation Partnership Project; Technical Specification Group Croup Core Network and Terminals; Principles and Guidelines for Services Definition; Stage 3 (Release 17) 3GPP TS 29.501 V17.3.1 (2021-09)
6. 3rd Generation Partnership Project; Technical Specification Group Core Network and Terminals; 5G System; Network Function Repository Services; Stage 3 (Release 17) 3GPP TS 29.510 V17.3.0 (2021-09)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for prioritizing among alternate network function (NF) instances, the method comprising:
   registering a first NF profile of a first NF instance with a first NF repository function (NRF), and defining, by the first NF instance as part of the first NF profile, alternate NF instance information identifying a plurality of individual alternate NF instances to function as backups in response to unavailability of the first NF instance and specifying, by the first NF instance, in the first NF profile, and for each alternate NF instance, a priority attribute value indicating a relative priority of the alternate NF instance with respect to the other alternate NF instances; and
   at a first consumer NF or service communication proxy (SCP), discovering, from the first NRF, the first NF profile of the first NF instance, detecting unavailability of the first NF instance, and, using the alternate NF instance information in the first NF profile to select and contact one of the alternate NF instances identified by the alternate NF instance information, wherein using the alternate NF instance information in the first NF profile to select one of the alternate NF instances includes reading, from the first NF profile, the priority attribute values of the alternate NF instances and selecting the one alternate NF instance having a lowest priority attribute value among the priority attribute values of the alternate NF instances specified in the first NF profile.

2. The method of claim 1 comprising registering a second NF profile of a second NF instance with a second NRF, and defining, as part of the second NF profile, alternate NF instance information identifying a plurality of individual alternate NF instances to function as backups in response to unavailability of the second NF instance and, for each alternate NF instance, a priority attribute value indicating a relative priority of the alternate NF instance with respect to the other alternate NF instances specified for the NF profile of the second NF instance.

3. The method of claim 2 wherein the first and second NF instances are members of an NF set and the alternate NF instance information in the first NF profile identifies the second NF instance as an alternate for the first NF instance and the alternate NF instance information in the second NF profile identifies the first NF instance as an alternate for the second NF instance.

4. The method of claim 1 wherein registering the first NF profile includes registering a first SCP profile of a first SCP instance, defining the alternate NF instance information includes defining alternate SCP instance information identifying a plurality of alternate SCP instances as part of the first SCP profile, discovering the first NF profile includes discovering the first SCP profile, and using the alternate NF instance information includes using the alternate SCP instance information in the first SCP profile to select and contact one of the alternate SCP instances.

5. The method of claim 1 wherein registering the first NF profile includes registering a first NF profile of a first producer NF instance, defining the alternate NF instance information includes defining the alternate NF instance information identifying a plurality of alternate producer NF instances as part of the first NF profile, discovering the first NF profile includes discovering the first NF profile of the first producer NF instance, and using the alternate NF instance information includes using the alternate NF instance information in the NF profile to contact one of the alternate producer NF instances.

6. The method of claim 1 wherein using the alternate NF instance information to select and contact one of the alternate NF instances includes selecting the alternate NF instance using the priority attribute values specified for the alternate NF instances and capacity values specified for the alternate NF instances.

7. The method of claim 1 wherein the alternate NF instance information includes, for each of the alternate NF instances, at least one of:
an NF instance identifier; and
a fully qualified domain name (FQDN) and a locality.

8. The method of claim 7 wherein the alternate NF instance information for each of the alternate NF instances includes the NF instance identifier, which identifies an individual SCP instance or an individual producer NF instance, and the FQDN and the locality of the individual SCP or individual producer NF instance.

9. The method of claim 1 wherein the alternate NF instance information identifies, using the priority attribute values specified for the alternate NF instances, at least a secondary NF instance and a tertiary NF instance to function as alternates for the first NF instance.

10. A system for prioritizing among alternate network function (NF) instances, the system comprising:
a first NF instance for registering a first NF profile of the first NF instance with a first NF repository function (NRF), and defining, by the first NF instance as part of the first NF profile, alternate NF instance information identifying a plurality of individual alternate NF instances to function as backups in response to unavailability of the first NF instance and specifying, by the first NF instance, in the first NF profile, and for each alternate NF instance, a priority attribute value indicating a relative priority of the alternate NF instance with respect to the other alternate NF instances; and
a first consumer NF or service communication proxy (SCP) for discovering, from the first NRF, the first NF profile of the first NF instance, detecting unavailability of the first NF instance, and, using the alternate NF instance information in the first NF profile to select and contact one of the alternate NF instances identified by the alternate NF instance information, wherein using the alternate NF instance information in the first NF profile to select one of the alternate NF instances includes reading, from the first NF profile, the priority attribute values of the alternate NF instances and selecting the one alternate NF instance having a lowest priority attribute value among the priority attribute values of the alternate NF instances specified in the first NF profile.

11. The system of claim 10 comprising a second NF instance for registering a second NF profile of the second NF instance with a second NRF, and defining, as part of the second NF profile, alternate NF instance information identifying a plurality of individual alternate NF instances to function as backups in response to unavailability of the second NF instance and, for each alternate NF instance, a priority attribute value indicating a relative priority of the alternate NF instance with respect to the other alternate NF instances specified for the NF profile of the second NF instance.

12. The system of claim 11 wherein the first and second NF instances are members of an NF set and the alternate NF instance information in the first NF profile identifies the second NF instance as an alternate for the first NF instance and the alternate NF instance information in the second NF profile identifies the first NF instance as an alternate for the second NF instance.

13. The system of claim 10 wherein the first NF instance comprises a first SCP instance, the first NF profile comprises a first SCP profile, and the alternate NF instance information identifies a plurality of alternate SCP instances as part of the first SCP profile.

14. The system of claim 10 wherein the first NF instance comprises a first producer NF instance, the first NF profile comprises an NF profile of the first producer NF instance, and the alternate NF instance information identifies a plurality of alternate producer NF instances as part of the first NF profile.

15. The system of claim 10 wherein the consumer NF or SCP is configured to use the alternate NF instance information to select and contact one of the alternate NF instances by selecting the alternate NF instance using the priority attribute values specified for the alternate NF instances and capacity attribute values specified for the alternate NF instances.

16. The system of claim 10 wherein the alternate NF instance information includes, for each of the alternate NF instances, at least one of:
an NF instance identifier; and
a fully qualified domain name (FQDN) and a locality.

17. The system of claim 16 wherein the alternate NF instance information for each of the alternate NF instances includes the NF instance identifier, which identifies an individual SCP instance or an individual producer NF instance, and the FQDN and the locality of the individual SCP or individual producer NF instance.

18. The system of claim 10 wherein the alternate NF instance information identifies, using the priority attribute values specified for the alternate NF instances, at least a secondary NF instance and a tertiary NF instance to function as alternates for the first NF instance.

19. One or more non-transitory computer readable media having stored thereon executable instructions that when executed by one or more processors of one or more computers control the one or more computers to perform steps comprising:
registering a first NF profile of a first network function (NF) instance with a first NF repository function (NRF), and defining, by the first NF instance as part of the first NF profile, alternate NF instance information identifying a plurality of individual alternate NF instance to function as backups in response to unavailability of the first NF instance and specifying, by the first NF instance, in the first NF profile, and for each alternate NF instance, a priority attribute value indicating a relative priority of the alternate NF instance with respect to the other alternate NF instances; and at a first consumer NF or service communication proxy (SCP), discovering, from the first NRF, the first NF profile of the first NF instance, detecting unavailability of the first NF instance, and, using the alternate NF instance information in the first NF profile to select and contact one of the alternate NF instances identified by the alternate NF instance information, wherein using the alternate NF instance information in the first NF profile to select one of the alternate NF instances includes reading, from the first NF profile, the priority attribute values of the alternate NF instances and selecting the one alternate NF instance having a lowest priority attribute value among the priority attribute values of the alternate NF instances specified in the first NF profile.

\* \* \* \* \*